US008146035B1

(12) United States Patent
Schumacher et al.

(10) Patent No.: US 8,146,035 B1
(45) Date of Patent: Mar. 27, 2012

(54) POWER ESTIMATION OF A CIRCUIT DESIGN

(75) Inventors: Paul R. Schumacher, Berthoud, CO (US); Smitha Sundaresan, Louisville, CO (US); Alan Frost, Cupertino, CA (US); Pradip K. Jha, Cupertino, CA (US)

(73) Assignee: Xilinx, Inc., San Jose, CA (US)

(*) Notice: Subject to any disclaimer, the term of this patent is extended or adjusted under 35 U.S.C. 154(b) by 441 days.

(21) Appl. No.: 12/398,270

(22) Filed: Mar. 5, 2009

(51) Int. Cl.
G06F 9/455 (2006.01)
G06F 17/50 (2006.01)

(52) U.S. Cl. ........ 716/109; 716/106; 716/116; 716/119; 716/127

(58) Field of Classification Search .............. 716/54, 716/106, 109, 116, 119, 127, 132
See application file for complete search history.

(56) References Cited

U.S. PATENT DOCUMENTS

| 6,151,568 | A  | * | 11/2000 | Allen et al. .............. 703/14 |
| 6,345,379 | B1 | * | 2/2002  | Khouja et al. ............ 716/115 |
| 7,249,010 | B1 |   | 7/2007  | Sundararajan et al. |
| 7,406,673 | B1 |   | 7/2008  | Patterson et al. |
| 7,555,741 | B1 | * | 6/2009  | Milton et al. ............. 716/101 |
| 7,587,620 | B1 | * | 9/2009  | Egier et al. .............. 713/320 |
| 2004/0123249 | A1 | * | 6/2004 | Sato et al. ................ 716/1 |

OTHER PUBLICATIONS

Chen, Deming et al., "High-Level Power Estimation and Low-Power Design Space Exploration for FPGAs," The 44$^{th}$ Design Automation Conference (DAC'07), Jun. 4-8, 2007, pp. 529-534, San Diego, California.

U.S. Appl. No. 12/041,167, filed Mar. 3, 2008, Schumacher et al.
U.S. Appl. No. 12/041,182, filed Mar. 3, 2008, Schumacher et al.
U.S. Appl. No. 12/975,102, filed Dec. 21, 2010, Jameel Hussein et al.
U.S. Appl. No. 13/217,496, filed Aug. 25, 2011, Paul R. Schumacher et al.
Asadi, Ghazanfar et al., "Soft Error Rate Estimation and Mitigation for SRAM-Based FPGAs," *Proc. of the 13$^{th}$ ACM/SIGDA International Symposium on Field Programmable Gate Arrays*, Feb. 20, 2005, pp. 1-12, ACM, New York, New York, USA.
Chapman, Ken, *SEU Strategies for Virtex-5 Devices*, XAPP864 (v2.0), Apr. 1, 2010, pp. 1-16, Xilinx, Inc., San Jose, California, USA.
Duan, Lide et al., "Versatile Prediction and Fast Estimation of Architectural Vulnerability Factor from Processor Performance Metrics," *Proc. of the 2009 IEEE 15$^{th}$ International Symposium on High Performance Computer Architecture*, Feb. 14, 2009, pp. 129-140, IEEE, Piscataway, New Jersey, USA.

(Continued)

*Primary Examiner* — Nghia Doan
*Assistant Examiner* — Brian Ngo
(74) *Attorney, Agent, or Firm* — LeRoy D. Maunu

(57) ABSTRACT

Approaches for estimating power consumption of a circuit from a circuit design. According to one embodiment, a representation of the circuit design specifies a plurality of circuit elements for implementing the circuit design. The circuit elements are matched to structural templates. Each structural template is representative of one or more circuit elements and has associated information descriptive of one or more toggle rates. Respective estimated toggle rates are determined for the circuit elements of the circuit design based on the information descriptive of one or more toggle rates associated with the matched structural templates. An estimated power consumption level is determined as a function of the estimated toggle rates of the circuit elements, and data indicative of the estimated power consumption level is output.

12 Claims, 6 Drawing Sheets

OTHER PUBLICATIONS

Hu, Ching et al., *NSEU Mitigation in Avionics Applications*, XAPP1073 (v1.0), May 17, 2010, pp. 1-12, Xilinx, Inc., San Jose, California, USA.

JEDEC Solid State Technology Association, Measurement and Reporting of Alpha Particle and Terrestrial Cosmic Ray-Induced Soft Errors in Semiconductor Devices, *JEDEC Standard JESD89A*, Oct. 2006, pp. 1-94, especially equations A-3, A-4, A-5, A-6 and A-7, and table A.3-C in Annex A, JEDEC Solid State Technology Association, Arlington, Virginia, USA.

Li, Xiaodong et al., "Online Estimation of Architectural Vulnerability Factor for Soft Errors," *Proc. of the 35$^{th}$ Annual International Symposium on Computer Architecture*, Jun. 21, 2008, pp. 1-12, IEEE Computer Society, Washington, DC, USA.

Mukherjee, Shubhendu S. et al., "A Systematic Methodology to Compute the Architectural Vulnerability Factors for a High-Performance Microprocesor " *Proc. of the IEEE/ACM 36$^{th}$ Annual International Symposium on Microarchitecture*, Dec. 3, 2003, pp. 29-40, IEEE, Piscataway, New Jersey, USA.

Sundararajan, Prasanna, "Estimation of Single Event Upset Probability Impact of FPGA Designs," *Proc. of the 6$^{th}$ Annual International Conference on Military and Aerospace Programmable Logic Devices*, Sep. 9, 2003, pp. 1-4.

Xilinx, Inc., *Device Reliability Report*, UG116 (v5.11), Nov. 1, 2010, pp. 1-110, especially Table 1-15, "Real Time Soft Error Rates," Xilinx, Inc., San Jose, California, USA.

\* cited by examiner

POWER ESTIMATION OF A CIRCUIT DESIGN

FIELD OF THE INVENTION

The present invention generally relates to estimating power consumption of a circuit based on a circuit design.

BACKGROUND

Power estimation for a circuit design that is to be implemented in a programmable IC (integrated circuit) such as a PLD (programmable logic device) is typically performed using designer-estimated resource counts or information from a completely implemented design. The power estimation also uses a clock frequency and global toggle rate defaults, which may be individually changed by the designer.

These approaches to power estimation can have a number of disadvantages. Designer estimation of logic resources can be substantially inaccurate compared to what is actually implemented in the programmable IC by the design tools. The exact programmable logic resources called out by synthesis, technology mapping and performance optimizations are difficult for the designer to predict. Also, generic or global toggle rate defaults may be approximately accurate on averages, but are unlikely to work well on all designs and fail to account for the variability within a design for different processing structures. For example, specific structures and paths within a design have been observed to have significant variance from the design average. Further, designer estimates of toggle rates can be quite inaccurate relative to the actual toggle rates of structures in an implemented design. In addition, it is time-consuming and costly to have to complete a design such that it can be fully implemented in a target programmable IC in order to determine the power consumption.

The present invention may address one or more of the above issues.

SUMMARY

The various embodiments of the invention provide approaches for estimating power consumption of a circuit from a circuit design. In one embodiment, a method includes storing a representation of the circuit design. The representation specifies a plurality of circuit elements for implementing the circuit design. A computing arrangement matches the circuit elements to structural templates. Each structural template is representative of one or more circuit elements and has associated information descriptive of one or more toggle rates. Respective estimated toggle rates for the circuit elements of the circuit design are determined by the computing arrangement based on the information descriptive of one or more toggle rates associated with the matched structural templates. The computing arrangement determines an estimated power consumption level of the circuit design as a function of the estimated toggle rates of the circuit elements, and outputs data indicative of the estimated power consumption level.

In another embodiment, a system is provided for estimating power consumption of a circuit from a circuit design. The system includes at least one processor and a storage arrangement coupled to the processor. The storage arrangement has stored therein processor-executable instructions and a representation of the circuit design. The representation specifies a plurality of circuit elements for implementing the circuit design. The instructions, when executed by the processor, cause the processor to match the circuit elements to structural templates. Each structural template is representative of one or more circuit elements and has associated information descriptive of one or more toggle rates. Respective estimated toggle rates are determined for the circuit elements of the circuit design based on the information descriptive of one or more toggle rates associated with the matched structural templates. The instructions further cause the processor to determine an estimated power consumption level of the circuit design as a function of the estimated toggle rates of the circuit elements, and output the result.

A processor-readable storage medium is configured with processor-executable instructions for estimating power consumption of a circuit from a circuit design. The instructions, when executed by a processor, cause the processor to perform the steps including inputting a representation of the circuit design. The representation specifies a plurality of circuit elements for implementing the circuit design. The steps further include matching the circuit elements to structural templates. Each structural template is representative of one or more circuit elements and has associated information descriptive of one or more toggle rates. Respective estimated toggle rates are determined for the circuit elements of the circuit design based on the information descriptive of one or more toggle rates associated with the matched structural templates. The steps further include determining an estimated power consumption level of the circuit design as a function of the estimated toggle rates of the circuit elements, and outputting data indicative of the estimated power consumption level.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
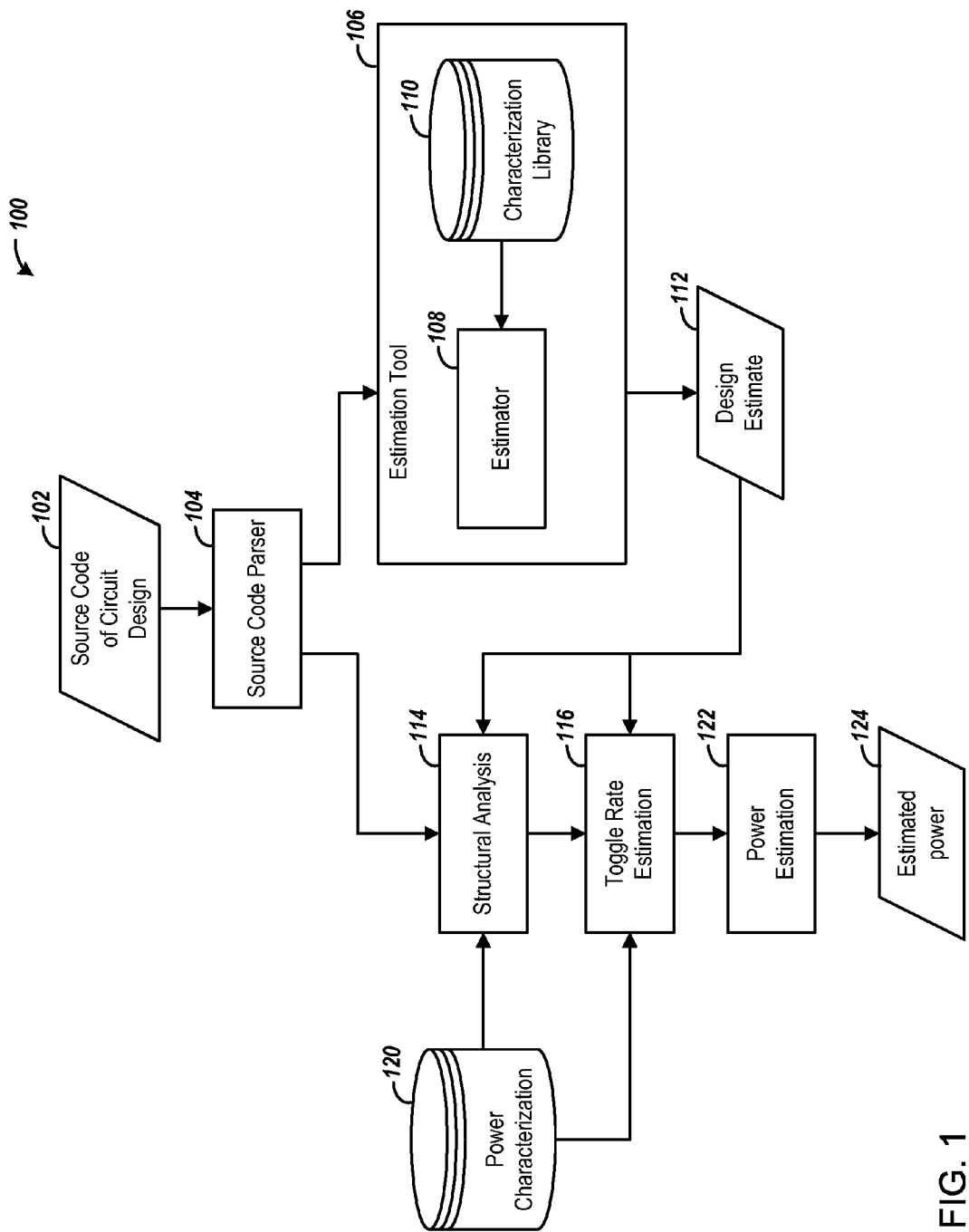
FIG. 1 is a block diagram of a system for estimating power consumption of a circuit based on an input circuit design.

FIG. 1 is a block diagram of a system 100 for estimating power consumption of a circuit based on an input circuit design. A parser/elaborator is run on a source code specification of the circuit design to determine the circuit elements that implement the design. A resource estimator operates on those circuit elements to estimate the hardware resources for those elements. The circuit elements are compared to pre-characterized structural templates of circuits elements, which have associated toggle rates previously established. The associated toggle rates of the pre-characterized structural templates are used as the toggle rates for the matching circuit elements. The power consumption of the circuit is then estimated based on those toggle rates and the resource estimation results for the circuit elements of the circuit design.

The pre-characterized structural templates and associated toggle rates can be generated from a set of representative circuit designs of various types and sizes, for example. The pre-characterized structural templates generalize various types and sizes of common circuit elements (e.g., finite state machines (FSMs), data processing engines, communication elements, counters, and/or barrel shifters). Unique characteristics of the circuit elements are specified by the pre-characterized structural templates so that those characteristics may be matched to circuit elements in a design to be analyzed. For example, an FSM may contain a particular combination of comparators, multiplexers, and registers, and that particular combination may be specified in a structural template. The structural templates are stored in a power characterization database. In one embodiment, additional information describing the common circuit elements is also determined and stored in the power characterization database. Using a counter as an example of a common circuit element, possible parameters include: bit width, step size, clock enable existence and toggle rate, and type (e.g., up, down, up-down). The structural template for the counter can indicate a circuit composed of an adder and/or subtractor, a representation of a constant (e.g., ties to ground and power), one or more multiplexers, and an N-bit register and connections.

The representative circuit designs are simulated to determine the toggle rates for the relevant circuit elements of each representative circuit design. In addition, an estimated average of the toggle rate of all of the signals in each representative circuit design is derived as a function of the type and the size of the representative circuit design. Various test vectors are applied to the representative design as needed, and the representative design is simulated to calculate the toggle rates of the various common circuit elements. The resulting toggle rates may be stored in association with the proper structural templates in the power characterization database. Additionally or alternatively, other well known techniques such as curve fitting can be used to characterize the toggle rate for a structural template, if the number of structural templates required to cover all possible combinations of parameter values for those circuit elements covered by the structural templates is too large. For example, the use of curve fitting can reduce the toggle rate characterization to an equation based on type and size parameters (e.g., number of inputs and states of an FSM). Various state machine designs (having varying numbers of inputs, states, etc.) may be characterized using a simulator and arriving at a corresponding empirical version of these formulas. Further detail regarding the generation of the pre-characterization data, including the structural templates and the estimated toggle rates, is discussed below in reference to FIG. 2.

The following paragraphs describe estimating the power consumption of a target circuit design using system 100, with the structural templates and estimated toggle rates from representative circuit designs having been established as described above. The source code of a target circuit design 102 is provided to source code parser and elaborator 104, such as a hardware description language (HDL) parser, which inputs the source code of the design and generates a netlist, for example. The source code parser provides the netlist to an estimation tool 106. The estimation tool 106 includes an estimator 108 that receives the netlist. The estimation tool 106 generates a design estimate 112 for the target circuit design based on the input netlist and data from a characterization library 110. The characterization library 110 may include raw data of a table and/or functions characterizing the data. The estimator 108 evaluates the circuit elements identified in the netlist, and uses estimation data from the characterization library to generate the design estimate 112, which includes the resource requirements of the target circuit design. The design estimate 112 can be, for example, an elaborated netlist and an estimation database for the elements in the netlist (e.g., adders, multipliers, comparators, shifters, and/or memories). Together, the netlist and database may contain the following information: the quantity, types, and parameters (e.g., bit width) of elements contained in the target design; how these elements may be mapped to hardware resources; and the structure of the design, specifically how these elements are inter-connected. The estimation tool may be implemented using any general purpose computing arrangement, and may be a part of another tool for implementing a design on a programmable logic device, for example. Further detail regarding the generation of the design estimate 112 is discussed below in reference to FIG. 2.

In one embodiment, template matching is performed by structural analysis block 114 to correlate the design estimate 112 with the structural templates of the pre-characterized designs as stored in power characterization database 120. The template matching can occur at multiple levels of a circuit design. For example, if a multiplier or multiplier-accumulator (MACC) is found to have a toggle rate or a toggle rate equation that is a function of bit widths and pipeline stages, then that toggle rate or equation can be used by the toggle rate estimation block 116 to estimate the toggle rates for any multipliers or MACCs found in the target circuit design. In another example, a design structure containing multiple elements from the HDL elaboration may be collectively identified as a pre-characterized circuit (e.g., an FSM as described above).

All circuit elements in the design estimate 112 that are identified by structural analysis 114 to be a part of the FSM can be grouped together. Based on the parameters of the FSM and the pre-characterized toggle rate of the FSM from the power characterization database 120, a toggle rate is estimated for the FSM by toggle rate estimation block 116. The toggle rate of the FSM is also dependent upon the toggle rates of the FSM inputs. Determining the toggle rates of the FSM inputs entails identifying the inputs to the FSM block (the block being the collection of instances tagged as part of this FSM) and finding the toggle rates of those inputs. This can be done either with test vectors or with various vectorless techniques.

The toggle rate estimation block 116 may further use different toggle rates for different portions of the FSM (e.g., registers vs. combinational logic). It should also be noted that assumptions may be made on the state assignments (e.g., one-hot, binary, gray code), which have a large impact on the toggle rates. This is based upon the number of states as well as any user settings (e.g., attributes in the source code).

The template matching is performed by structural analysis block 114 on all hierarchical levels of the design, identifying and using groups of elements where applicable. Elements of the design estimate 112 that do not match structural templates in the power characterization database 120 can be assigned a default toggle rate. The output of toggle rate estimation block 116 includes a modified version of the design estimate 112, including toggle rates for the various elements of the target circuit design.

In one embodiment, additional information can also be extracted from the design estimate 112 for use by the toggle rate estimation block 116. This information can include, for example, clock domains, fanout statistics, number and type of input/output (I/O), estimated hardware part type based on estimation totals (if not specified by the designer), and other characteristics related to power estimation. In addition, the designer may be asked to provide clock frequencies and input pin toggle rates if this information is not present in the design estimate 112.

Finding clock domains involves finding all synchronous elements in the design (e.g., registers, memories), identifying the appropriate clock signal, then tagging all elements in the paths between synchronous elements as being in this domain. For power estimation, the designer sets the clock frequency and the elements are weighted by their estimated resource counts.

Fanouts are determined for all levels of the hierarchy by finding the number of loads of different nets. A load depends upon the resource estimation for every connection in the netlist. Also, a distinction is made between connections that use programmable routing resources by identifying those that most likely involve a lookup table-to-flip-flop connection within a configurable logic block of a programmable IC.

The number and type of I/O extracted from the design estimate 112 refers to the I/O in the netlist. Based upon the clock domain information above, the clock inputs are identified. Buses (groups of signals) are also identified.

Based upon the resource estimation results, a specific, ideal part type is identified. The designer may or may not specify the specific family (or sets of families) of parts from which the part is identified. The part identification may also be influenced by the fanout information above, which may influence the routability of the design.

Default values may be used for voltage and temperature, but may be changed by the designer to reflect anticipated operating conditions or requirements. In another embodiment, various algorithms are used by the toggle rate estimation block 116 to estimate toggle rates of any elements of the circuit design that do not match structural templates stored in the power characterization database 120 and that have not been assigned specific toggle rates by the toggle rate estimation block 116. Examples of such algorithms include statistical analysis, probabilistic techniques, glitch prediction, and filtering.

The power estimation block 122 determines the estimated power for a circuit, which is based on the target circuit design, using standard dynamic power calculations. The calculation of the estimated power consumption uses detailed characterized device data for the interconnect and logic resources estimated to be used in implementing the circuit design, the estimated toggle rates described above, and any changes in the nominal process, voltage, or temperature specified by the designer. The logic resources (e.g., lookup tables, flip-flops, block RAMs, and digital signal processors (DSPs) in an FPGA (field programmable gate array) type of programmable IC) are pre-characterized in the characterization library 100 with parameters that support calculating power consumption given toggle rates for the connected nets. From the specific logic resource and fanout, a likely placement and packing can be used to estimate the number and type of pre-characterized interconnect resources required. In addition, the size of the circuit element (e.g., counts of lookup tables, flip-flops, block RAMs, and DSPs) may be used as a weighting factor in calculating the power consumption.

Power consumption (P) of an electronic circuit, for example, CMOS, is estimated from leakage currents and from the equation $P=CV^2f$ (where C=current, V=voltage, and f=frequency). Because some signals in a circuit element may not transition for many clock cycles and other signals may have glitches, which may cause multiple transitions within a single clock cycle, "f" in this equation is not the clock frequency, but is instead the estimated toggle rate for the circuit element. The toggle rate is often expressed as a percentage of the clock rate, where 100% means the signal changes state once each clock cycle. In this case, the formula used is $P=\frac{1}{2} CV^2 f$ (where f=clock_rate*toggle_rate).

The power estimation block 122 computes an estimated power consumption level for each element of the circuit design using the estimated toggle rate and the size of the circuit element (as determined above). In one embodiment, additional design characteristics, for example, fanout, can be extracted from the circuit design for estimating power consumption. The fanout may indicate the expected capacitance of programmable interconnect resources used by each net in the design. The capacitance of each net can be estimated by considering the number of elements driven, the statistical usage of the actual programmable interconnect resources in designs using the structural templates, as well as pre-characterization values for that particular programmable IC.

The estimated power consumption levels for the elements are then summed to determine the total estimated power consumption of the circuit based on the target design, which is output as estimated power 120. The addition of design structure recognition and the intelligent assignment of toggle rates based on pre-characterized design structure knowledge yield a more accurate set of toggle rates for use in power estimation, thereby improving the accuracy of the estimated power consumption.

Figure 2:
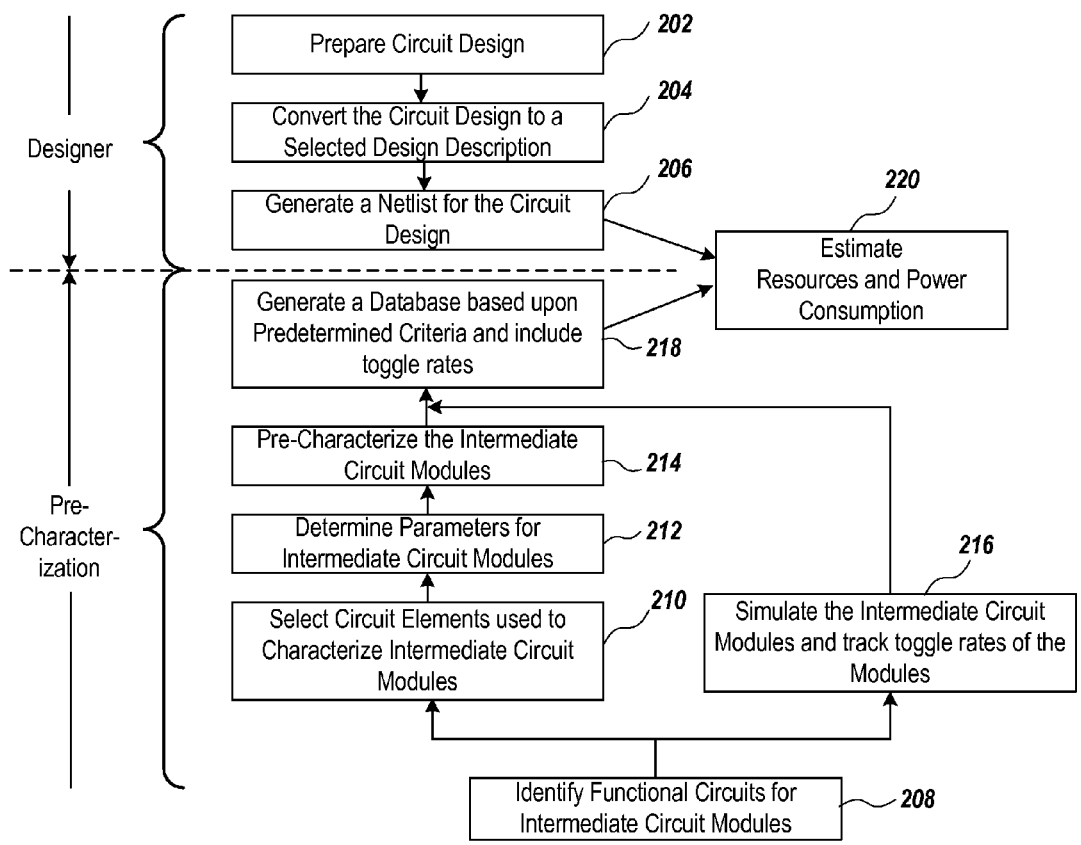
FIG. 2 is a flow diagram showing resource pre-characterization along with generating an estimate of power consumption.

FIG. 2 is a flow diagram showing resource pre-characterization along with generating an estimate of power consumption. The flow diagram generally includes two parts. The top part of the flow diagram illustrates a process followed by a designer, and the bottom part of the diagram illustrates the pre-characterization process. When implementing a circuit in programmable logic, it is necessary to map, pack, place, and route a circuit design, as is well known in the art. That is, elements of the circuit design are mapped to certain elements of programmable logic, and the mapped elements are packed into blocks of programmable logic. The various circuits that have been packed into blocks of programmable logic are then placed at certain locations of the device, before routing is performed. Because these steps, and more particularly placement and routing, are often time consuming and require engineering and computer resources, generating estimates based on elements of a netlist may be particularly advantageous to a designer. By pre-characterizing circuit elements that may be found in netlists for circuit designs, the methods of the present invention may enable estimating and relaying back to the designer, early in the design process, information about the implementation of a hardware system, such as resources of a programmable IC required for implementing a circuit design, and performance characteristics of the circuit design during execution, such as latency, throughput, area, and power consumption estimates.

According to one embodiment of the invention, illustrated in FIG. 2, a netlist generated for a particular design is analyzed according to pre-characterization data describing circuit elements of netlists. In particular, after a circuit design is prepared, for example, by way of a graphical user interface, as shown in block 202, the circuit design is converted to a selected design description as shown in block 204. By way of example, after a schematic of a circuit design is generated, a high level design description, such as a high level language (HLL) or a register transfer language (RTL) representation, may be provided for the circuit design. A netlist is then generated for the circuit design, as shown in block 206. While a selected design description is given by way of example as an HLL or RTL representation, it is important to note that the methods of the present invention enable generating an estimate of a circuit design based upon a netlist regardless of how the circuit design is converted to a netlist. For example, a netlist may be generated directly from the circuit design, or from some other representation of the circuit design other than an HLL or RTL representation. However, whether an HLL or RTL representation of a circuit design is used to generate a netlist may affect the resources in which the circuit elements are implemented, while an RTL representation of the circuit design may provide limited choices in how the circuit design is implemented.

Before any given circuit design is analyzed, the circuit elements that may commonly be found in any netlist are pre-characterized. The circuit elements defined in a netlist are independent of the higher level representation used to generate the netlist, and the netlist is typically independent of the hardware platform that is eventually targeted. In some cases, some netlists may be generated with circuit elements such as intellectual property (IP) cores which are specific to a targeted hardware platform, as will be described in more detail below.

A netlist contains information regarding content as well as structural information and connectivity for a circuit design. More particularly, a net of a netlist represents a collection of interconnect lines from the output of a logic block of a design to inputs of the next destination block, while a path represents a sequence of nets between registers comprising a connection from a source to a specific destination. A path may be defined as a clock-to-clock path, such as one register to another register, a register to an output, an input to a register, or an input to an output, as is well known in the art. Accordingly, the methods described herein involve creating a mid-level view of a circuit design, by describing the circuit design in terms of a library of well-known, parameterizable circuit elements of a netlist. The circuit elements of the netlist are preferably at a level that enables generating an estimate in terms of elements of a targeted device. As will be described in more detail below, these circuit elements are pre-characterized for a given target device and according to predetermined input parameters.

A netlist may also contain IP cores. An IP core is a larger, pre-defined function and enables a designer to complete a large design faster. That is, an IP core comprises a plurality of circuit elements normally found in a netlist. Examples of IP cores include finite impulse response (FIR) filters and fast Fourier transform (FFT) cores, each of which may comprise a large number of circuit elements found in a netlist. That is, when a circuit designer needs the functionality of a FIR circuit or an FFT circuit, it is possible to select an IP core for those circuits that are predefined and ready to implement. As will be described in more detail below, the resource estimate of an IP core alone may also be determined according to methods of the present invention.

In one embodiment, the resource/power estimator handles structural primitives (e.g., lookup tables (LUTs), flip-flops, block RAMs (BRAMs), and DSPs) as well as the inferred macros described below. For resource estimation, these primitives are added to a count total for their respective primitive type. For power estimation, these primitives are pre-characterized and toggle rates are propagated based upon the determined lookup table equation.

In order to perform the pre-characterization of elements in the netlist, intermediate circuit modules, also called macros, comprising circuit elements defined in a netlist are identified, as shown in block 208. Intermediate circuit modules may include a single element of a netlist. By way of example, the intermediate circuit modules may include an adder/subtractor, a comparator, a multiplier, logical operators such as a bitwise AND/OR/XOR or a reduction-OR, logical shifters and rotators, multiplexers, counters, memories, or registers of a netlist.

The intermediate circuit modules are characterized in terms of the circuit element(s) determined to characterize the intermediate circuit modules in block 210. For example, the intermediate circuit modules may be characterized in terms of resources commonly found in certain families of PLDs, such as LUTs, BRAMS, DSP devices, or any other element described in FIG. 6. The resources used to characterize the intermediate circuit modules may be a superset of all elements of a variety of devices, including elements that are not necessarily common between different families of devices. However, the characterization may include information related to the circuit elements of the netlist. As will be described in more detail below, other static and dynamic characteristics of the intermediate circuit modules may be generated. Accordingly, it may be possible both to determine whether a circuit design may be implemented in a given device, and to benchmark a number of implementations of a circuit according to resource and performance criteria.

Parameters, which are inputs to an intermediate circuit module or otherwise characterize the intermediate circuit module, are determined as shown in block 212. Examples of parameters include a device family (or device within a family of devices), tool settings, number of inputs, bit widths of inputs and outputs, number of significant bits, and depths of memories. The device family parameter enables an estimate to be generated by picking the resource requirements of the intermediate circuit modules found in the netlist that are generated for a given family. By way of example, a Virtex®-4 FPGA device from Xilinx, Inc. of San Jose, Calif. has 4-input LUTs, while a Virtex®-5 FPGA device has 6-input LUTs. As should be apparent, the requirements for LUTs of a given intermediate circuit module may be different based which family of device is chosen. Also, within a given family, the amount and/or configuration of memory may vary for different devices, leading to different resource estimates. As will be described in more detail below, numerous intermediate circuit modules will be defined in terms of the circuit elements of the netlist, and predetermined parameters defining the intermediate circuit module. That is, for a given circuit element of a netlist, a plurality of intermediate circuit modules are pre-characterized according to a plurality of parameter sets as shown in block 214.

For establishing toggle rates, or equivalents, for various circuit elements, the intermediate circuit modules are simulated and the toggle rates of the circuit elements within the intermediate circuit modules are tracked, as shown in block 216. A database that includes the resource estimates of the intermediate circuit modules along with the toggle rates of circuit elements of the intermediate circuit modules is then generated, as shown in block 218.

An estimate of resources is generated for a circuit design and the estimated power consumption of the circuit design is determined, as shown in block 220. In order to generate the estimates, both a netlist for which an estimate is to be generated (e.g., a netlist produced by step 206) and pre-characterization data (e.g., a database produced by step 218) are input to a resource estimation tool. The resource requirements and performance characteristics of the entire circuit design are then estimated based on the circuit elements identified in the netlist of the circuit design. Some design-level estimation techniques may also be used. For example, optimizations such as constant propagation and strength reduction (e.g., multiplying by four may be optimized to become a left-shift by two bits) may be performed either prior to or during the resource estimation. A back-end synthesis tool, which performs placement and routing according to designer-selectable tool settings, may affect the final amount of resources required by the circuit design. The estimated resources are stored in a database accessible by the designer, where resources may be tagged by hierarchy, bit widths, and/or library element types. Because the methods of the present invention are independent of the origin of the netlist for generating a resource estimate, the methods of the present invention provide flexibility when generating a resource estimate.

The pre-characterization may involve identifying parameter sets and their value ranges to create parameter vectors. For example, a parameter set including three parameters, each with two different values, results in $2^3$ or eight vectors. Implementation tools may be run for each vector to create a table of results. By repeating this series of steps for each netlist element, a library of estimation resources may be generated. These pre-characterization results may be stored in a number of different ways. As will be described in more detail below, the data may be stored in a table of raw data, or some other comparison technique such as curve fitting may be performed to reduce the amount of data that is stored. After the intermediate circuit modules are characterized, the estimation tool performs tasks to enable generating an estimate for a given netlist. That is, the pre-characterization results and given netlist are read, where the estimation tool performs an individual estimation on each element in the netlist based upon its parameter set. As will be described in more detail below, the estimation tool may also perform various refinements and optimizations.

It should be noted that three different software tools, namely a user interface tool, a netlist-generation tool, and an estimation tool, may be used to implement the methods of the present invention. These tools may be independent of one another or may be combined. According to one embodiment, the user interface tool and the netlist-generation tool are incorporated in a common tool, whereas the estimation tool is a provided as a stand-alone tool. According to an alternative embodiment, all three tools are combined in a single, common tool.

Figure 3:
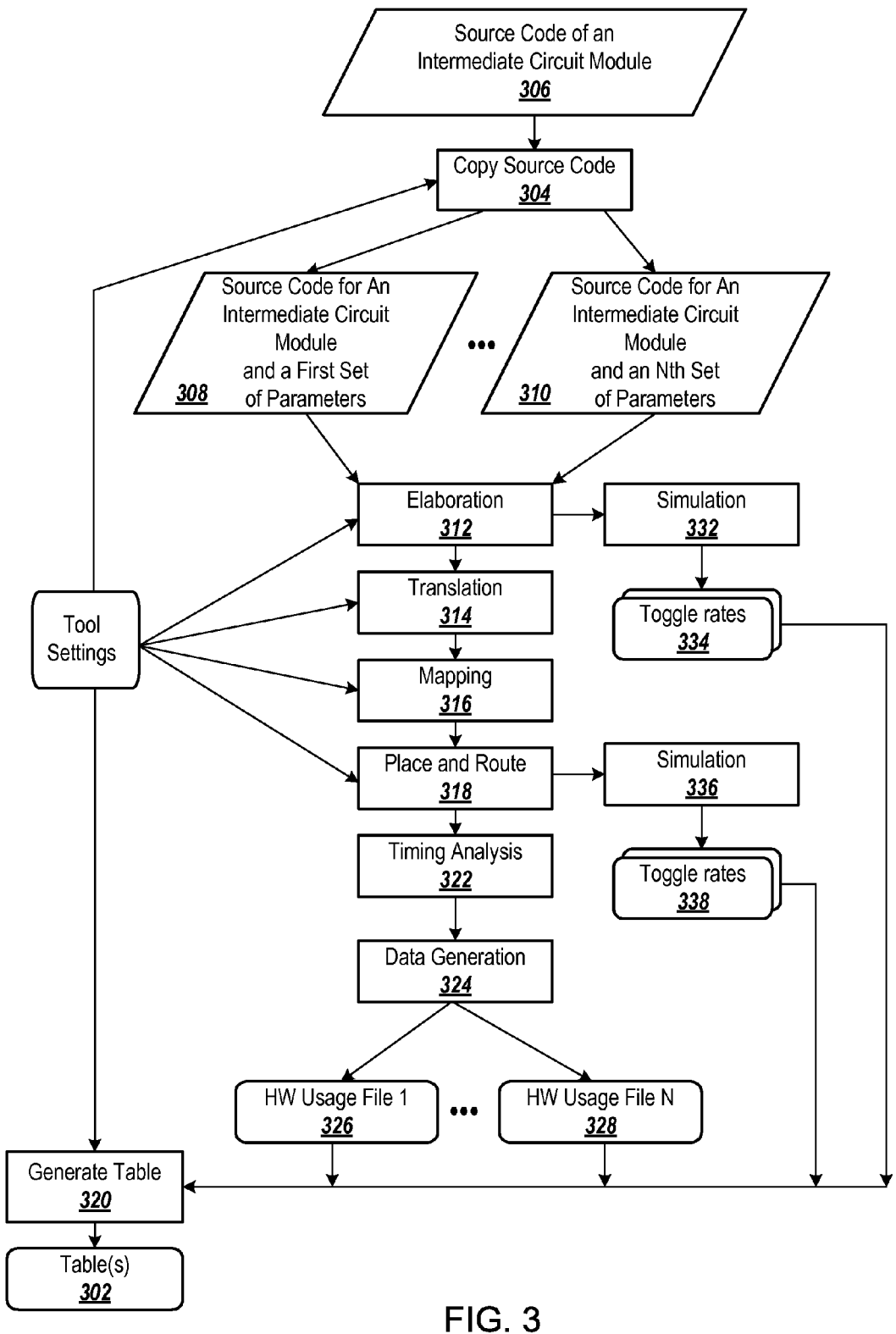
FIG. 3 is a flow diagram showing the creation of a table having resource estimates for intermediate circuit modules along with toggle rates associated with circuit elements of those intermediate circuit modules.

FIG. 3 is a flow diagram showing the creation of one or more tables having resource estimates for intermediate circuit modules along with toggle rates associated with circuit elements of those intermediate circuit modules. A number of tasks are performed to generate pre-characterization data, shown in FIG. 3 as data in a table 302. A first task 304 is to copy source code of an intermediate circuit module 306 a predetermined number of times to generate respective source code modules 308 and 310 for a given intermediate circuit module using a predetermined number of parameter sets. Although FIG. 3 shows generating multiple source code modules for a single intermediate circuit module, it should be understood that a similar procedure can be performed for each intermediate circuit module based upon parameter sets relevant to that intermediate circuit module. Further, while copying the source code a predetermined number of times is shown by way of example, the same set of source code to cover all intermediate circuit modules and all parameter sets may be used, where all cases are iterated to generate the data according to the different parameter sets.

For each source code module associated with a different parameter set, various tasks are performed. An elaboration task 312, as set forth above, is performed, followed by a translation task 314 for generating a file used by mapping task 316. Finally, a place and route task 318 is performed. It should be noted that tasks 304, 312-318, and 320 (generating the table(s)) may be affected by tool settings that may set various parameters for implementing a circuit design in a device. For example, a designer may set various preferences related to size and speed of the implementation of the resulting design, or even how circuit elements of the device, such as BRAMs and LUTs, are used. Further, while certain tasks are required for generating an estimate of resources, other tasks of FIG. 3 may be required for generating estimates of other static and dynamic characteristics of the circuit design implemented in a given device. For example, while only elaboration is necessary for determining resource requirements of the circuit design, it may be necessary to perform all of the tasks, up to and including the place and route task 318, to determine other characteristics, such as area, as well as dynamic characteristics, such as throughput of the circuit. Timing analysis may be performed in task 322, and the output of the timing analysis may be used to establish another dynamic characteristic of the circuit related to latency. Finally, a data generation task 324 is performed to generate respective hardware usage files 326 and 328 for the different circuit implementations resulting from the different parameter sets. Those hardware usage files are provided for generating a table(s) in task 320.

The circuits that result from implementing the intermediate circuit modules with the different parameter sets are simulated to determine the toggle rates to associate with the circuit elements of the intermediate circuit modules. In an example embodiment, high-level simulation, low-level simulation, or both may be used to determine the toggle rates.

A high-level simulation task 332 can be performed using the netlists provided by the elaboration task 312, there being a respective netlist resulting from elaboration of the source code module for each of the parameter sets. Selected test vectors (not shown) are input to the simulation task for stimulating logic on selected paths of the intermediate circuit modules. Standard simulation tools may be used to perform the simulation and accumulate the resulting toggle rates 334. There is a respective set of toggle rates for each of the intermediate circuit modules 308 and 310. The sets of toggle rates are provided to the table generation task 320 for storing in the table(s) 302.

A low-level simulation task 336 can be performed using the respective placed and routed designs from the place and route task 318. As with the high-level simulation, selected test vectors (not shown) are input to the simulation task for stimulating logic on selected paths of the intermediate circuit modules. Standard simulation tools may be used to perform the low-level simulation and accumulate the resulting toggle rates 338. There is a respective set of toggle rates for each of the intermediate circuit modules 308 and 310, and the sets of toggle rates are provided to the table generation task 320 for storing in the table(s) 302.

In an example embodiment, the table(s) 302 includes columns for each of the parameter sets, where the rows specify various resource requirements and performance characteristics for the parameter sets. For example, there may be rows for the circuit elements estimated to implement the intermediate circuit module, such as elements of FPGAs, including slices, total LUTs, logic LUTs, RAM LUTs, BRAMs, and DPSs. In addition, there may be rows for performance characteristics including, for example, area, throughput, power and latency.

There are a number of different ways to store the toggle rates determined by simulating the intermediate circuit modules. While the raw data may be stored in a table in association with those circuit elements that implement an intermediate circuit module, regression analysis such as curve fitting may be used to reduce the amount of data. This technique finds a curve or function that best maps the input parameters to the output results. Typically, this is done to improve performance/ speed; enable filling in the gaps of the input characterization results using interpolation or extrapolation; and reduce the data storage requirements by using equation coefficients rather than tables of raw results. A simplified, exemplary equation for an adder implemented in 4-input LUTs is as follows:

$$LUTs = \max(N_A, N_B)$$

where $N_A$ is the bit width of adder input A, $N_B$ is the bit width of adder input B, and LUTs is the number of 4-input LUTs required to implement the adder. This equation can become more complex if the usage of constants, parameterized number of inputs, carry out, etc. are factored into the equation.

Figure 4:
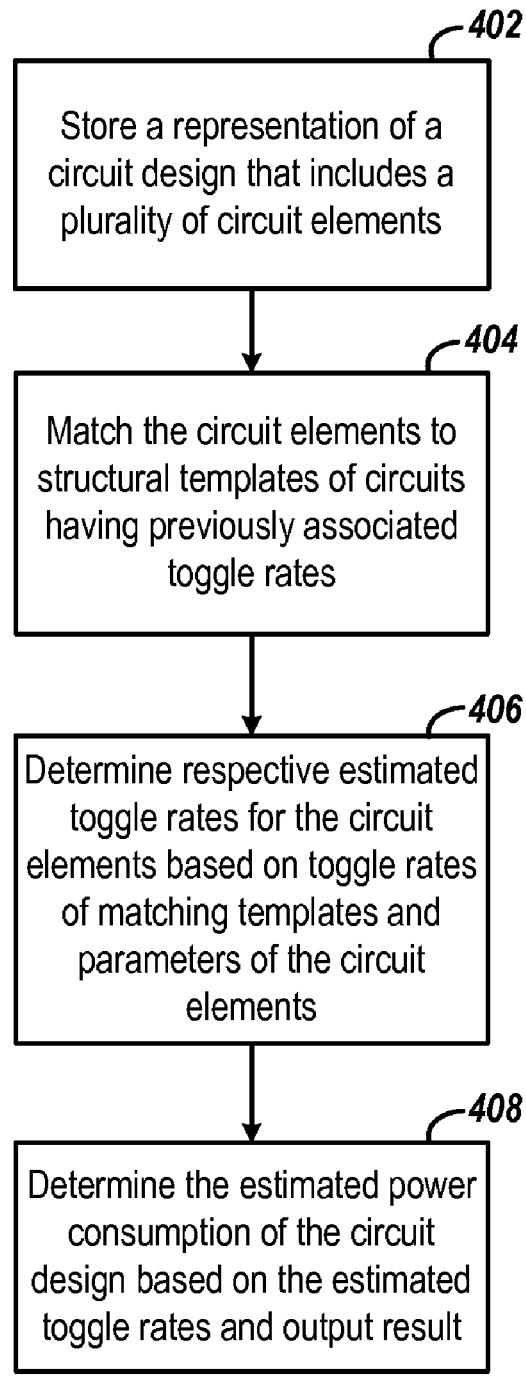
FIG. 4 is a flow diagram of a method for estimating power consumption of a circuit based on an input circuit design.

FIG. 4 is a flowchart of a method for estimating power consumption of a circuit based on an input circuit design, in accordance with an embodiment of the invention. In step 402, a representation of the circuit design is stored. The representation specifies a plurality of circuit elements for implementing the circuit design. The circuit elements are matched to structural templates of circuit elements in step 404. The structural templates each have an associated toggle rate value or equation to determine the toggle rate based on parameters as earlier described. In step 406, respective estimated toggle rates for the circuit elements are determined based on the toggle rates associated with the matched structural templates and the associated parameters of the circuit elements. In step 408, the estimated power consumption of the circuit design is determined and the result is output. The estimated power consumption is a function of the estimated toggle rates of the circuit elements, as described above.

Figure 5:
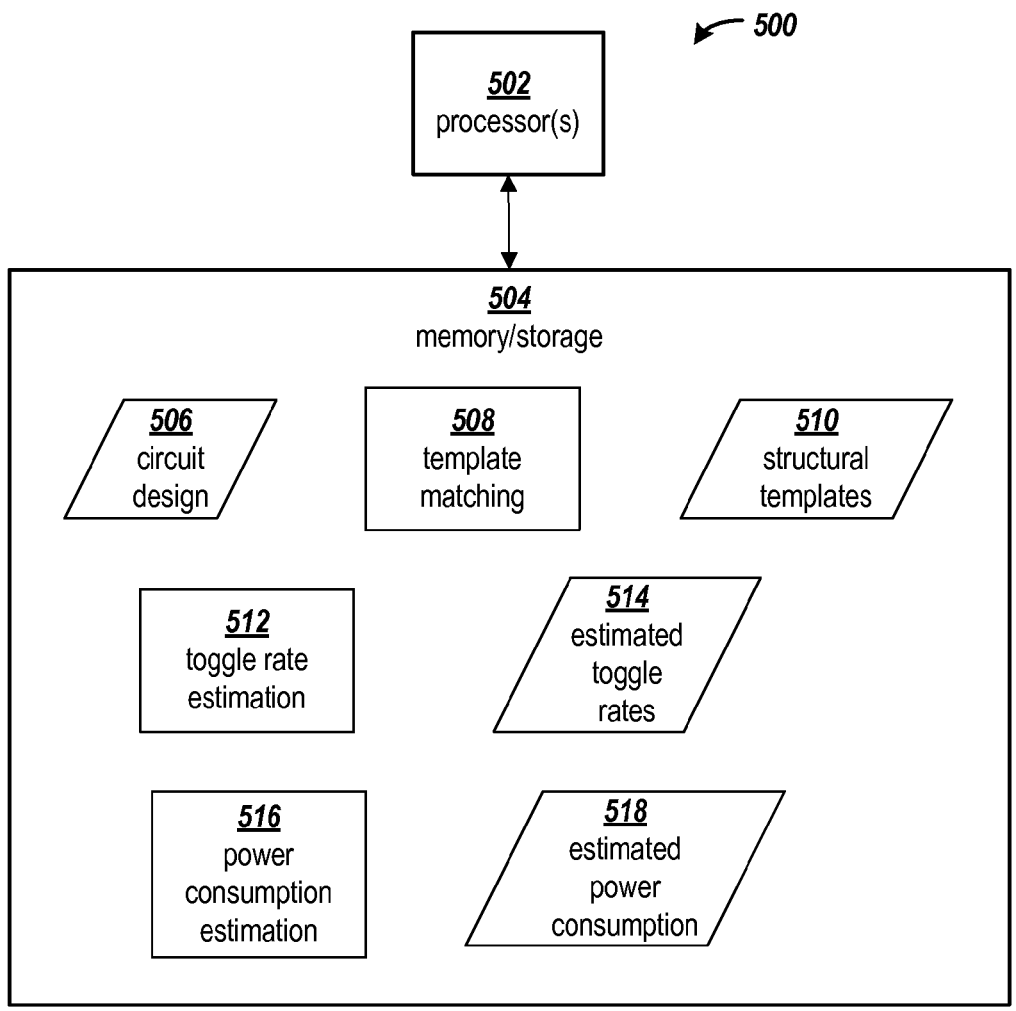
FIG. 5 is a block diagram of an example computing arrangement on which the processes described herein may be implemented.

FIG. 5 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, or electronic storage devices.

Computing arrangement 500 includes one or more processors 502 coupled to a memory/storage arrangement 504. The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, pipelined, etc.).

The memory/storage arrangement 504 is representative of hierarchical storage commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The processor arrangement 502 executes the software stored in memory/storage arrangement 504, and reads data from and stores data to the memory/storage arrangement according to the processes described above. An operating system (not shown) manages the resources of the computing arrangement.

A template matching module 508 executes on the processor arrangement 502 and matches circuit elements of the circuit design 506 to structural templates 510 of circuits, each of which has an associated toggle rate.

A toggle rate estimation module 512 executes on the processor arrangement 502 for determining respective estimated toggle rates 514 for the circuit elements based on the toggle rates associated with the matched structural templates. The estimated toggle rates 514 may be stored in the memory/storage arrangement 504.

A power consumption estimation module 516 also executes on the processor arrangement 502 for determining the estimated power consumption 518 of the circuit design 506 as a function of the estimated toggle rates 514 of the circuit elements. The estimated power consumption 518 may also be stored in the memory/storage arrangement 504.

Figure 6:
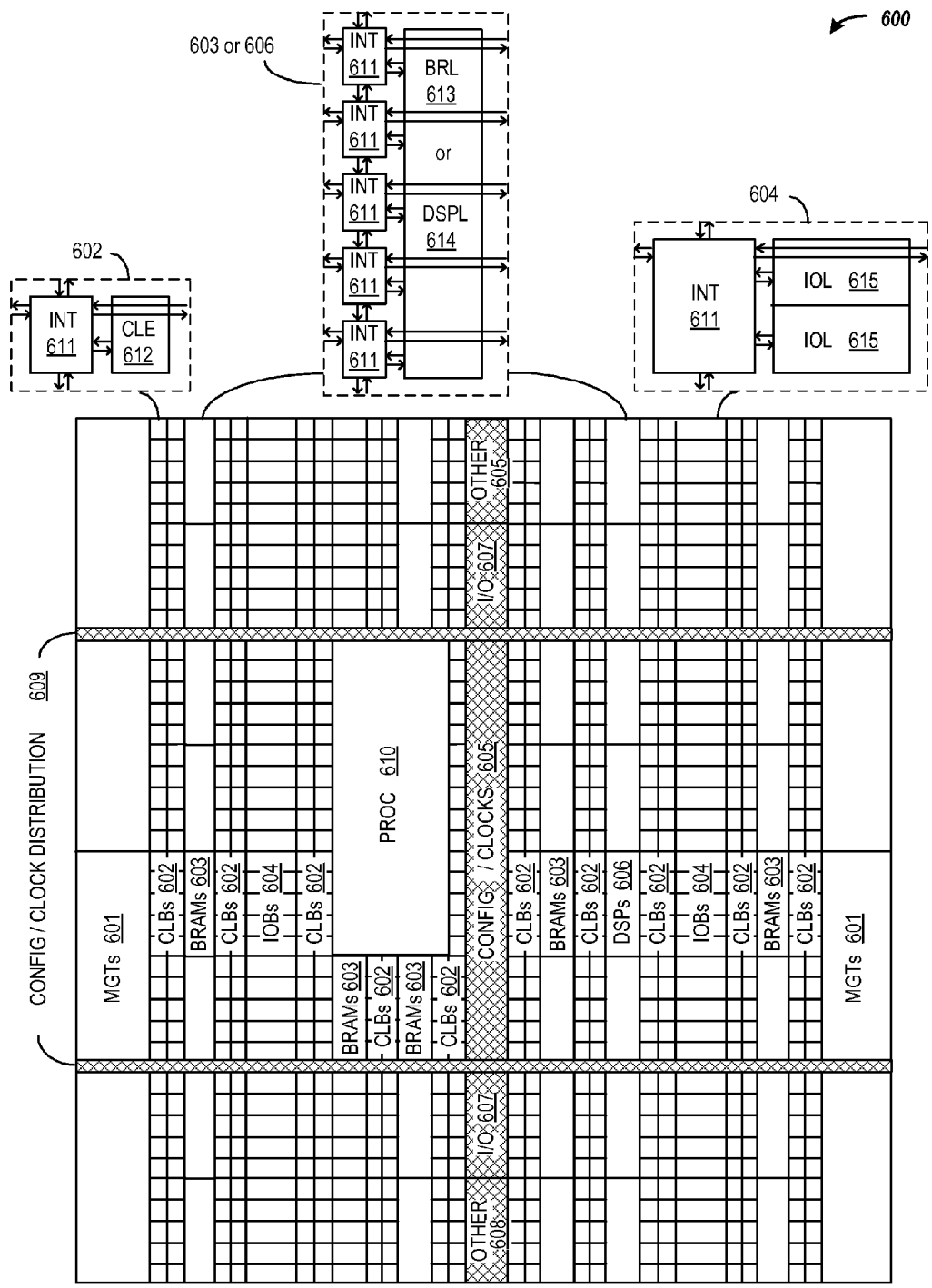
FIG. 6 illustrates an architecture of an example field programmable gate array (FPGA) that includes several different types of programmable logic blocks.

FIG. 6 illustrates an architecture of an example field programmable gate array (FPGA) that includes several different types of programmable logic blocks. The FPGA of FIG. 6 is suitable, for example, for implementing the methods of the present invention. However, those skilled in the art will appreciate that the FPGA of FIG. 6 provides only one example of an integrated circuit device on which the methods of the present invention can be practiced.

Advanced FPGAs can include several different types of programmable logic blocks in the array. For example, FIG. 6 illustrates an FPGA architecture 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., clock ports), configuration and reconfiguration port 616, and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 612) that can be programmed to implement logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of design logic, but the number of adjacent CLB columns varies with the overall size of the FPGA.

The present invention is thought to be applicable to a variety of systems and methods for estimating power consumption. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for estimating power consumption of a circuit from a circuit design to be analyzed, the method comprising:
   simulating a plurality of one or more sample circuit designs, wherein each sample circuit design includes circuit elements of one or more structural templates, and the simulating outputs toggle rates for the circuits elements of the sample circuit designs;
   determining for each structural template, from the output toggle rates, an equation for at least one of the one or more circuit elements of the structural template;
   establishing a database of the structural templates, each structural template having the equation as associated information descriptive of a toggle rate of the one or more circuit elements of the structural template;
   storing a representation of the circuit design to be analyzed, the representation specifying a plurality of circuit elements for implementing the circuit design to be analyzed;
   matching the circuit elements of the circuit design to be analyzed to the structural templates in the database by a computing arrangement;
   determining, by the computing arrangement, respective estimated toggle rates for the circuit elements of the circuit design to be analyzed based on the information descriptive of one or more toggle rates associated with the matched structural templates in the database;
   determining, by the computing arrangement, an estimated power consumption level of the circuit design to be analyzed as a function of the estimated toggle rates of the circuit elements; and
   outputting data indicative of the estimated power consumption level by the computing arrangement.

2. The method of claim 1, further comprising:
   storing the output toggle rates in association with the circuit elements of one or more of the structural templates.

3. The method of claim 1, wherein the structural templates of circuits include at least one of a finite state machine, a multiplier accumulator (MACC), a counter, and a barrel shifter.

4. The method of claim 1, further comprising:
   determining respective estimated power consumption levels for the circuit elements of the circuit design to be analyzed based on the respective estimated toggle rates; and
   determining the estimated power consumption level of the circuit design to be analyzed as a sum of the respective estimated power consumption levels.

5. The method of claim 1, wherein the circuit elements of the structural templates include elements of a programmable logic device.

6. A system for estimating power consumption of a circuit from a circuit design to be analyzed, comprising:
   at least one processor; and
   a storage arrangement coupled to the at least one processor, wherein the storage arrangement has stored therein processor-executable instructions and a representation of the circuit design to be analyzed, wherein the instructions when executed by the at least one processor cause the at least one processor to perform steps including:
      simulating a plurality of one or more sample circuit designs, wherein each sample circuit design includes circuit elements of one or more structural templates, and the simulating outputs toggle rates for the circuits elements of the sample circuit designs;
      determining for each structural template, from the output toggle rates, an equation for at least one of the one or more circuit elements of the structural template;
      establishing a database of the structural templates, each structural template having the equation as associated information descriptive of a toggle rate of the one or more circuit elements of the structural template;
      matching the circuit elements of the circuit design to be analyzed to the structural templates in the database;
      determining respective estimated toggle rates for the circuit elements of the circuit design to be analyzed based on the information descriptive of one or more toggle rates associated with the matched structural templates in the database;
      determining an estimated power consumption level of the circuit design to be analyzed as a function of the estimated toggle rates of the circuit elements; and
      outputting data indicative of the estimated power consumption level.

7. The system of claim 6, the steps further comprising:
   storing the output toggle rates in association with the circuit elements of one or more of the structural templates.

8. The system of claim 6, wherein the structural templates of circuits include at least one of a finite state machine, a multiplier accumulator (MACC), a counter, or a barrel shifter.

9. The system of claim 6, the operations further comprising:
   determining respective estimated power consumption levels for the circuit elements of the circuit design to be analyzed based on the respective estimated toggle rates; and
   determining the estimated power consumption level of the circuit design to be analyzed as a sum of the respective estimated power consumption levels.

10. The system of claim 6, wherein the circuit elements of the structural templates include elements of a programmable logic device.

11. An apparatus, comprising:

a non-transitory processor-readable storage medium configured with processor-executable instructions for estimating power consumption of a circuit from a circuit design to be analyzed, wherein the instructions when executed by a processor cause the processor to perform steps including:

simulating a plurality of one or more sample circuit designs, wherein each sample circuit design includes circuit elements of one or more structural templates, and the simulating outputs toggle rates for the circuits elements of the sample circuit designs;

determining for each structural template, from the output toggle rates, an equation for at least one of the one or more circuit elements of the structural template;

establish a database of the structural templates, each structural template having the equation as associated information descriptive of a toggle rate of the one or more circuit elements of the structural template;

inputting a representation of the circuit design to be analyzed, the representation specifying a plurality of circuit elements for implementing the circuit design to be analyzed;

matching the circuit elements of the circuit design to be analyzed to structural templates in the database;

determining respective estimated toggle rates for the circuit elements of the circuit design to be analyzed based on the information descriptive of one or more toggle rates associated with the matched structural templates in the database;

determining an estimated power consumption level of the circuit design to be analyzed as a function of the estimated toggle rates of the circuit elements; and outputting data indicative of the estimated power consumption level.

12. The apparatus of claim 11, wherein the steps further comprise:

storing the output toggle rates in association with the circuit elements of one or more of the structural templates.

* * * * *